United States Patent [19]

O'Dell et al.

[11] Patent Number: 4,532,170

[45] Date of Patent: Jul. 30, 1985

[54] SCUFF-RESISTANT LAMINATES

[75] Inventors: Robin D. O'Dell, Pasadena; Israel S. Ungar; Herbert I. Scher, both of Randallstown, all of Md.

[73] Assignee: Nevamar Corporation, Odenton, Md.

[21] Appl. No.: 634,163

[22] Filed: Jul. 25, 1984

Related U.S. Application Data

[62] Division of Ser. No. 521,762, Aug. 9, 1983, Pat. No. 4,499,137.

[51] Int. Cl.³ .......................... B32B 3/00; B32B 7/14; B32B 5/18; B32B 9/26
[52] U.S. Cl. .................................. 428/143; 428/147; 428/204; 428/327; 428/322.2; 428/486
[58] Field of Search ............... 428/172, 173, 204, 208, 428/211, 206, 327, 407, 143, 142, 147, 164, 322.2, 322.7, 90

[56] References Cited

U.S. PATENT DOCUMENTS

| | | | |
|---|---|---|---|
| 3,726,817 | 4/1973 | Niswonger | 428/447 |
| 4,109,043 | 8/1978 | Delopp | 428/206 |
| 4,112,169 | 9/1978 | Huffmon et al. | 428/206 |
| 4,139,671 | 2/1979 | Kelly et al. | 428/204 |
| 4,255,480 | 3/1981 | Scher et al. | 428/208 |
| 4,263,081 | 4/1981 | Scher et al. | 428/208 |

*Primary Examiner*—Marion E. McCamish
*Assistant Examiner*—Beverly K. Johnson
*Attorney, Agent, or Firm*—Sheridan Neimark; Karl W. Flocks

[57] ABSTRACT

The scuff resistance of a high-pressure laminate is improved by incorporating in or very near the surface thereof, finely divided polyethylene wax preferably having a particle size of about 1–25 microns and a melting point of 220°–230° F. The wax is incorporated as part of a coating mixture applied to the face of an unimpregnated decor paper sheet in an ultra-thin layer, which layer is dried at a temperature below the wax melting point and then impregnated with conventional melamine-formaldehyde resin. The impregnated sheet is placed onto a sheet of convention phenolic resin impregnated core sheets and consolidated in the conventional way under heat and pressure. During consolidation, the wax particles "bloom", or migrate to the surface. The finished laminate surface has greatly improved scuff resistance.

13 Claims, No Drawings

SCUFF-RESISTANT LAMINATES

This is a division, of application Ser. No. 521,762 filed Aug. 9, 1983 now U.S. Pat. No. 4,499,137.

FIELD OF INVENTION

The present invention relates to laminates and, more particularly, decorative laminates having high scuff resistance.

BACKGROUND OF THE INVENTION

High pressure decorative laminates are conventionally produced by stacking and curing under heat and pressure a plurality of layers of paper impregnated with various synthetic thermosetting resins. In normal practice the assembly, from the bottom up, consists of a plurality, e.g. three to eight, core sheets made from phenolic resin impregnated kraft paper, above which lies a decor sheet impregnated with melamine resin; on top of the decor sheet is provided an overlay sheet which, in the laminate, is almost transparent and provides protection for the decor sheet.

The core sheets are conventionally made from kraft paper of about 90-155 pound ream weight. Prior to stacking, the kraft paper is impregnated with a water-alcohol solution of phenol formaldehyde resole, dried and partially cured in a hot air oven, and finally cut into sheets.

The decor sheet is a high quality, 50-125 ream weight, pigment filled, alpha cellulose paper that has been impregnated with a water-alcohol solution of melamine-formaldehyde resin, dried and partially cured, and finally cut into sheets. The decor sheet, prior to impregnation with the resin, usually has been printed with a decorative design, or with a photogravure reproduction of natural materials, such as wood, marble, leather etc., but it may also be solid colored.

The overlay sheet is almost invariably used when the decor sheet has a surface printing in order to protect the printing from abrasive wear. The overlay sheet is a high quality alpha cellulose paper of about 15-35 pounds ream weight that is also impregnated with melamine-formaldehyde resin in a manner similar to that used for the decor sheet, except that a greater amount of resin per unit weight of paper is used. The individual sheets are stacked in the manner indicated above and, if six sheets of impregnated core paper are used, there results a finished laminate having a thickness of about 50 mils, it being understood that a different number of sheets can be used to provide thicker or thinner laminates.

The stack of sheets as described above is placed between polished steel plates and subjected to about 230°-340° F. (e.g. 300° F.) at 800-1600 psi (e.g. 100 psi) for a time sufficient to consolidate the laminate and cure the resins (e.g., about twenty-five minutes). This causes the resin in the paper sheets to flow, cure and consolidate the sheets into a unitary laminated mass referred to in the art as a decorative high-pressure laminate. In actual practice, two laminated stacks are pressed back to back, separated by a coated release sheet that allows the two laminates to be peeled apart after separation. Also, a large proportion of the stacks are laminated with an aluminum foil-kraft paper composite sheet inserted between the overlay and the metal plate, with the aluminum facing the overlay, in order to obtain a laminate having a lower gloss and a slightly textured surface which is desirable for some products.

At the completion of the laminated operation, the backs of the laminates are sanded to permit gluing to particle board, plywood or other substrates. The glued, laminate surfaced panel is then fabricated into furniture, kitchen counter tops, table tops, store fixtures and other end-use applications widely accepted for the combination of appearance, durability and economy.

A number of variations of the above-described general process are known, particularly those operations designed to obtain special effects in appearance and texture. Also other curing cycles are possible and, in fact, sometimes other resin systems are used as well.

Besides decorative high-pressure laminates referred to above, there are also a number of low-pressure products which have been developed in recent years, including low-pressure laminates using either saturated polyester resins, or melamine-formaldehyde resin. One of the fastest growing materials competing with high-pressure laminates in recent years is a product referred to as low-pressure melamine board which is normally pressed in a short cycle at 175-225 psi at 325°-350° F. These low-pressure products have the advantage of being normally less expensive, but they cannot be given the title of "high pressure laminates" because such a product must meet a variety of rigid standards promulgated by the National Electric Manufacturers Associates, NEMA LD3-1980, which include standards relating to abrasive wear, stain resistance, heat resistance, impact resistance, dimensional stability, etc. While various other decorative printed, surfacing materials, such as some of the low-pressure laminates, have certain of the desirable characteristics, no products other than high-pressure laminates currently available have all of these properties.

One of these properties in particular which is very important is abrasion resistance. Adequate abrasion resistance is provided in most cases by the overlay sheet. Superior abrasion resistance is provided in accordance with the Scher et al U.S. Pat. Nos. 4,255,480 and 4,263,081 and their progeny, and at a lower cost.

In some cases, however, such as low pressure laminates and high pressure laminates intended for use in low wear areas, such as wall paneling, fairly low abrasion resistance is tolerable. If a high-pressure decorative laminate is prepared in a conventional manner, with a normal 35-40% resin content in the decor sheets, but without an overlay sheet, the abrasion resistance will be only about 50-75 cycles NEMA test LD-3.01.

Besides resistance to abrasion and wear, it is necessary that decorative laminates, especially "high-pressure laminates", have surfaces characterized by resistance to heat, stain by common household chemicals and foods, impact and boiling water, all consistent with the NEMA LD3-1980 standards.

In addition to the above, another source of damage to a laminate surface is scuffing. Prior to the actual installation of a laminate surface, the laminate sheet must be handled many times, cut to size, bonded to a substrate, cut to final size, edged, and then finally moved to a final location and installed. During all this handling, the laminate surface can come into sliding contact with surfaces of other sheets, corners of sheets, and corners of edges of other materials. During these various sliding contacts, the laminate surface can gain unsightly scuff marks, which are not distinctly scratches or cuts in the laminate surface. For example, if a white colored laminate is rubbed by the corner or edge of a blue colored laminate, the scuff mark appears to have blue particles embedded therein. In this sense, the scuff mark is analogous to the process known as "galling" when two similar clean surfaces of metals are rubbed together at high pressure. It is well known to metallurgists that galling represents a transfer of metal from one surface to the other.

Some scuffs do not have an obvious transfer of material from an offending contracting object. In these cases, the area of the scuff appears to have been burnished to a higher gloss, or dulled to a lower gloss. This type of scuff appears to be caused by a very small amount of flow in the laminate surface due to the pressure of contact with the corner or edge of the offending object. Most frequently, however, the scuffs appear to be caused by a combination of the two effects just described, i.e. galling together with burnishing or dulling.

In the past, most decorative laminates were produced in light colors for work tops and other large area uses. Dark or intense colors could not be used in large areas because of the scuffing problem and therefore were most often used in smaller areas for color accents. Within the past ten years, however, the demand for dark and intense colors has greatly increased, even for large area uses such as the surfaces on store fixtures, elevator cabs, restaurant tables. As scuff marks of the kind described are much more visible when they occur on dark or intensely colored surfaces, than on light colored surfaces, they are much more objectionable to the owners of the installation. This has caused a significant amount of customer dissatisfaction, and considerable expense to the manufacturers and fabricators of laminate for replacement of defective installations.

Accordingly, it would be advantageous to provide a decorative laminate which avoids and reduces the problem of scuffing.

RELATED APPLICATION

In copending application Ser. No. 508,629, filed June 28, 1983, now pending, there are disclosed laminates which are both scuff-resistant and abrasion-resistant, and methods of making same. These are prepared by including a suitable lubricant in the abrasion resistant ultra-thin coatings disclosed in the Scher et al U.S. Pat. Nos. 4,255,480; 4,263,081; 4,305,987 and 4,327,141. However, in many cases abrasion resistance is not of primary importance, but scuff resistance is important.

SUMMARY OF THE INVENTION

It is accordingly, an object of the invention to overcome deficiencies in the prior art, such as indicated above.

It is another object to provide improved decorative laminates; and
to develop improved scuff resistance in the surface of decorative laminated plastic;
accomplish the improvement in an economical manner compatible with the laminating process; and
not harm other desirable properties of the laminate, and in particular, not reduce the clarity of the color or decorative printing in the decor layer.

These and other objects of the invention are attained by incorporating suitable lubricating substances into the upper surfaces of the laminates. It has been surprisingly found that the added lubricant provides substantially improved scuff resistance. In other words, it has been found possible to incorporate a lubricant into the upper surface without adversely affecting the physical properties of such laminates.

Another aspect of the invention involves how to incorporate such a lubricant into the laminate surface without reducing the physical properties of the laminate.

DETAILED DESCRIPTION OF EMBODIMENTS

The scuff resistance of high-pressure laminated plastic is improved by incorporating in or very near the surface finely divided solid wax particles having a particle size of up to 30 microns and a melting point of about 150°–285° F., preferably 220°–230° F. The wax is incorporated in a coating mixture applied as an ultra-thin layer (as in the abrasion-resistant coating of the aforementioned Scher et al patents, which are incorporated herein by reference, except for the presence of the mineral particles which are not used) to the face of an unimpregnated decor paper sheet, which is dried at a temperature below the wax melting point, and then impregnated with conventional melamine-formaldehyde resin or polyester resin.

The impregnated sheet is placed onto a suitable backing substrate such as a stack of conventional phenolic resin impregnated core sheets, and consolidated under heat and pressure. During consolidation, the wax particles "bloom", or migrate to the surface. The finished laminate surface is more slippery than normal, and has greatly improved scuff resistance. The particle size and concentration of the wax are selected to avoid reducing the color intensity or clarity of the decorated surface of the decor sheet.

The selection of the lubricant is important to obtain satisfactory results. Accordingly, the lubricant or mixture of lubricants should be compatible with the other components of the ultra-thin layer, exclusive of the mineral particles and silane, as disclosed in the aforementioned Scher et al U.S. Pat. No. 4,255,480 etc. Also, it should melt during pressing so that it will bloom to the laminate surface and be locked in without causing haze or deterioration. The wax should melt at a temperature below 260° F. to avoid haze in the product. However, haze can sometimes be tolerated, and therefore some higher melting waxes can sometimes be used, even though they do not melt during the laminating procedure.

A large number of waxes have been evaluated having different melt viscosities, melting points, and percents oxidation, in anionic and nonionic dispersions. It has been found that a nonionic type has less yellowing and high melt viscosity gives better dispersion. It has also been determined that lower melting point waxes bloom better and give more lubricity at lower concentration.

It has been also determined that powdered polyethylene can be dispersed in coating compositions used for the ultra-thin layer as an inert material similar to other insolubles without the use of detergents. It has been demonstrated that oxidized waxes work well as a lubricant but are subject to staining on the final laminate.

While it has been found that best results are achieved with fine powder wax, preferably micronized polyethylene wax, a wide variety of other lubricants can be used, depending on the circumstances. For example, it has been found that some lubricants will cause the resultant laminate to have a hazy surface, which result is undesirable in most case; however, there are some colors in which haze is tolerable. Among lubricants which are not preferred but which may be used under certain conditions may be mentioned micronized fluorocarbon polymers, tetrafluoroethylene polymer in fine particle size (e.g. SST-2 of Shamrock Chemicals Corporation or "Polyfluo 190" of Micro Powders, Inc.); stearates, such as sodium and zinc stearate; solid silicone resins; oxidized polyethylene waxes; microcrystalline waxes; ethylene co-polymers with acrylic acid or with vinyl acetate, etc. However, as noted above, the preferred lubricants constitute micronized polyethylene waxes, and particularly those commonly used in the formation of printing inks.

Crucial to producing the best product which is free of haze is to ensure that the lubricant melts during the laminating operation. However, if the lubricant melts at too low a temperature, i.e. at less than 140° F. or any temperature higher which is used during the drying of the ultra-thin coating, the molten lubricant will tend to wet the fibers of the decor sheet and will thereby cause blotches or a mottled appearance and frosty or graying color, which is undesirable in most cases, and/or even worse, will interfere or prevent resin saturation of the decor sheet by the impregnating resin (melamine or polyester) thereby resulting in an incompletely bonded laminate, a situation which cannot be tolerated. Also this prevents the wax from blooming, thereby causing relatively poor scuff resistance. When wax is not melted during the drying of the abrasion-resistant coating, it is available to disperse during laminate pressing and "blooms" to the surface. Thus, the wax melting point should be sufficiently low so that it melts and "blooms" at the melting point of the impregnating resin, i.e. melamine or polyester, and before such resin gels.

Higher melting point waxes, i.e. those not melting during lamination, may also cause light scattering and a frosty appearance. It is accordingly important in most cases that a solid lubricant be selected which does not melt during the drying of the ultra-thin abrasion-resistant coating, but which does melt subsequently during the laminating procedure.

For best results, the drying of the abrasion-resistant coating containing the lubricant should be at about 170°–190° F., above the minimum temperature of 140° F. and substantially below the melting point of the lubricant which is desirably 220°–230° F.

Another important factor is the quantity of lubricant used. In general, the scuff resistance of the resultant abrasion-resistant laminate tends to taper off as the quantity of lubricant becomes less than 3% based on the total weight of the dry components of the abrasion-resistance composition, and therefore a practical minimum is about 2.5% with amounts less than about 2% giving scuff resistance which in most cases is insufficient. The maximum quantity, again based on the total weight of dry components of the abrasion-resistance coating, can be 20% or more wax. If too much wax is used, it can result in clouding or haze; excessive quantities can result in a waxy surface failing to meet other NEMA LD-3 requirements. In terms of rate of application of wax, it has been found that excellent results are achieved at the application rate of 0.25 pounds of wax per ream of decor paper, and quantities of 0.175 to 0.5 pounds of wax per ream of decor paper have been used without problem.

The other ingredients of the coating composition, as applied in an ultra-thin layer to the upper surface of the decor sheet, are as described in the aforementioned Scher et al patents, incorporated by reference, with the exception that the abrasion-resistant mineral particles and the optional silanes are not used. In general, the composition includes a temporary binder material, such as microcrystalline cellulose, carboxymethyl cellulose and similar materials such as hydroxypropyl cellulose, methyl cellulose, polyvinyl alcohol, polyvinyl pyrrolidone, anionic acrylic polymer, sodium alginate and similar materials, etc., and mixtures thereof, so long as such materials are both compatible with the wax and are capable of withstanding the laminating conditions to give a satisfactory product. Sodium alginate and mixtures of microcrystalline cellulose and carboxymethyl cellulose have been used with success.

The ingredients including the temporary binder or mixture thereof, the solid lubricant particles and water are mixed to form a water slurry of suitable consistency so that it can be cast directly on the surface of the decor sheet as a very fine layer. The layer is then dried, it being understood that the drying temperature is a minimum of 140° F., preferably at least 180° F., when the binder material comprises microcrystalline cellulose. The calculated coating thickness, after drying, is on the order of 0.02–0.3 mils, preferably up to about 0.2 mils. Instead of casting the wet composition directly on the decor sheet, it can instead be cast on a temporary carrier, dried and then transferred to the decor sheet during lamination as shown by the technique of Ungar et al Ser. No. 442,070, filed Nov. 16, 1982.

The following examples and comparative examples will further illustrate the invention:

COMPARATIVE EXAMPLE 1

High-pressure decorative ARP laminate was made according to the process of Scher et al U.S. Pat. No. 4,255,480. After pressing and cooling, it was found that the surface was hard and had a high abrasion resistance and rate of wear according to NEMA LD3-1980. In addition, the superior scratch resistance of the ARP laminate could be demonstrated by rubbing with flint sandpaper, which when rubbed on ordinary laminate completely destroyed surface gloss and finish. While the sandpaper did not harm the ARP laminate, when the surface was stroked or rubbed with the edge of a light colored material, it showed signs of scuffing. Light material abraded and became embedded into the surface of the hard laminate. This deficiency is important because laminate is often subjected to sliding attack. One laminate may be pulled over another or another object may be rubbed over laminate surface by the ultimate consumer.

In various experiments, soaps such as sodium and zinc stearate were applied to the surface of the laminate. Unfortunately, this technique only supplied temporary improvement. Material washed off easily and the problem returned. Incorporation of these types of materials in melamine used for saturation of abrasion-resistant coated paper did not have any effect until the concentration was so high that the melamine properties deteriorated. Addition of stearates to the abrasion-resistant composition also gave poor results; excessive quantities were needed, and the stearates also, being soluble in water, washed from the surface.

COMPARATIVE EXAMPLE 2

Following the technique of the second part of Comparative Example 1, a number of dispersible waxes, especially polyethylene waxes, were incorporated in the melamine resin. These included Allied Chemical's AC629 and Duro Chemical Uniwax 2000 band 050. We evaluated 2.5%, 5%, 10%, 15% and 20% of wax in resin. In addition, a liquid silicone mold release, Dow QL-3667, was evaluated in the melamine. As before, improvement was found only at high levels where surface properties deteriorated.

COMPARATIVE EXAMPLE 3

In this example, the liquid silicone mold release agent, Dow QL-3677, was incorporated in the abrasion-resistant composition prior to its application to the face of the decor sheet. Again, good results were not achieved.

COMPARATIVE EXAMPLE 4

In this example, polytetrafluoroethylene ("Polyfluo 190") having a congealing point of 250° F. was added to the abrasion-resistant composition before coating onto a decor sheet in an ultra-thin layer. The results were only fair. Excessive quantities of PTFE are necessary to obtain even moderate scuff resistance. Another disadvantage of PTFE is its high cost.

EXAMPLE I

To 64 gallons of water were added 4 pounds of carboxymethyl cellulose 7L followed by mixing for 15 minutes. Next, 2.6 pounds of micronized polyethylene wax (Shamrock 394: MP 230° F.; specific gravity 0.95; penetration less than 1; and average particle size approximately 12.5 microns) and 20 pounds of Avicel RC591 microcrystalline cellulose were added and the mixture was stirred at a high shear until the viscosity was between 1500 and 2000 cps at 12 rpm. Next, 8 gallons of carboxymethyl cellulose mix containing 3.8 pounds pounds of CMC-7L were added and the pH was adjusted with 2.5 pounds acetic acid.

The composition was coated onto solid color decor paper at 1.5–2.0 pounds per ream dry weight, the coating was dried without melting the wax, and decor paper was impregnated with melamine resin to 50%–55% resin content and 5–7% volatile.

The so-manufactured decor paper was assembled on a phenolic core and pressed normally at 1,000 psi and 260°–300° F. The resultant laminate looked normal and had normal abrasion resistance. The laminate surface was slick to the touch and did not scuff. The laminate surface was scrubbed with detergent and warm water without reducing scuff resistance.

EXAMPLE II

To 64 gallons of water at 90°–115° F. are added slowly 6 pounds of carboxymethyl cellulose 7L (Hercules) with stirring until the CMC becomes dissolved. Then, 33.8 pounds Avicel RC791 (FMC) microcrystalline cellulose are added and the mixture is stirred. At this point, another 3.8 pounds of carboxymethyl cellulose in 8 gallons of water are added.

Next, an emulsion of 3.4 pounds of dispersible polyethylene wax, Uniwax 1050 (Durochemicals) in water are added. This composition is coated over the decor paper in an ultra-thin layer at the rate of 1.75–2.9 pounds per ream dry weight. The ultra-thin coating is dried at a temperature greater than 140° F., but less than the melting point of the polyethylene wax. The so-coated decor sheet is treated with melamine resin to 50%–55% resin content and 5%–7% volatile.

EXAMPLE III

Method of Example I is repeated using the following waxes.

| | |
|---|---|
| AC735 | Allied Chemical Company |
| MPP 123 | Micro Powders |
| A-12 | Allied Chemical Company |
| AC 392 | Allied Chemical Company |
| B6 | Allied Chemical Company |
| Shamrock 395 | Shamrock Chemical Company |
| MPP620 | Micro Powders |
| AC316 | Allied Chemical Company |
| AC540 | Allied Chemical Company |
| MPP611 | Micro Powders |

AC735 is a micronized polyethylene homopolymer having a softening point (ASTM E-28) of 110° C. and 230° F.; a hardness (ASTM. D-5) of 2.15 dmm; a density (ASTM D-1505) of 0.92 g/cc; and a Brookfield viscosity at 140° C. (284° F.) of 6,000 cps.

Lubricant A-12 is a "Polymist" polyethylene fine powder, having a density of 0.99 g/cc; a hardness of 0.5 dmm (100 g/5 sec/25° C.); a softening point of 140° C. (284° F.); an acid number of 30; and average particle size of 12 microns, and a particle size distribution of 2-24 microns.

Lubricant AC392 is an oxidized polyethylene homopolymer having a softening point of 138° C. (280° F.); a hardness of less than 0.5 dmm; a density of 0.99; a Brookfield viscosity of 9,000 cps at 149° C. (300° F.); and an acid number of 28.

Lubricant B6 is another "Polymist", polyethylene fine powder, having a density of 0.96; a hardness of 0.5 dmm; a softening point of 128° C. (262° F.); an average particle size of 6 microns; and a particle size distribution of 2-12 microns.

Lubricant AC 316 is another oxidized polyethylene homopolymer having a softening point of 140° C. (284° F.); a hardness of less than 0.5 dmm; a density of 0.98; a Brookfield viscosity of 30,000 cps at 149° C. (300° F.); and an acid number of 16.

Lubricant AC 540 is an emulsifiable ethylene/acrylic acid co-polymer having a softening point of 108° C. (226° F.); a hardness of 2.0 dmm; a density of 0.93; a Brookfield viscosity at 140° C. (284° F.) of 500 cps; and an acid number of 40.

Lubricant MPP123 is a micronized polyethylene wax, having a melting point of 230°–235° F.; a congealing point of 215°–220° F.; a penetration at 77° F. of 1.5; an acid and saponification value of 0; a density at 77° F. of 0.92; a maximum particle size of 15 microns and an average particle size of 4 microns.

Lubricant MPP620 is a micronized polyethylene wax, having a melting point of 241° F.; a congealing point of 237° F.; a penetration at 77° F. of 1; an acid and saponification value of 0; a density at 77° F. of 0.94; a maximum particle of 10 microns; and an average particle size of 2.5 microns.

Lubricant MPP611 is a micronized polyethylene wax, having a melting point of 232° F.; a congealing point of 229° F.; a penetration at 77° F. of 1; a density of 0.95; and an average particle size of 2.5 microns.

Lubricant Shamrock 395 is a high-melt polyethylene wax, having a high degree of crystallinity, a melting point of 250° F.; a density of 0.95; and a penetration of less than 1.

EXAMPLE IV

In place of microcrystalline cellulose as the primary temporary or surface binder, a number of Examples were carried out to demonstrate other compatible binders, such as sodium alginate (Kelgin LV of Kelco). Thus, a mixture of solid lubricant bound with sodium alginate can be coated on the decor paper, after which the paper is then saturated with melamine or polyester, and dried and made into a laminate. The surface of this laminate is slick and resistant to scuffing.

A solution was made up containing six parts of Kelgin LV and six parts of polyethylene wax (Shamrock 394) in 300 parts of water. This mixture was coated on a sheet of brown saturating paper at a rate of 1.5 to 2.0 pounds per ream. The paper was saturated with melamine resin and laminated as in Example I. The results were the same.

EXAMPLE V

Additional examples were carried out to demonstrate the transfer technique consistent with Ungar et al Ser. No. 442,070.

Both the Kelgin mixture described in Example IV and the Avicel mixture of Example I were coated on release papers. These included aluminum foil on paper, as well as parchment. After drying, the release carrier was pressed in a normal cycle, coating down on a solid color pattern sheet saturated with melamine. Normal phenolic core was used. Standard press cycles of 800–1200 psi and 260°–300° F. were used. After the release carrier was removed, it was found that the coating had transferred to melamine coated paper. The resultant laminate was slippery and scuff resistant as above.

It will be obvious to those skilled in the art that various changes may be made without departing from the scope of the invention and the invention is not to be considered limited to what is described in the specification. For example, the present invention can also be used in conjunction with overlay paper rather than the decor sheet.

What is claimed is:

1. A facing sheet for use in the manufacture of stain- and scuff-resistant decorative laminates, said facing sheet having thereon an ultra-thin facing layer comprising
   (1) a solid, finely particulate lubricant in an amount sufficient such that, during use of the facing sheet to make decorative laminate, the particulate lubricant melts and blooms to the surface thereby providing a decorative laminate having simultaneously good clarity and improved scuff resistance, with the proviso that said solid lubricant is not an oxidized wax or a silicone resin, and
   (2) sufficient binder material for said particles of lubricant to bind said particles to the surface of said facing sheet, said facing sheet being impregnated with a thermosetting resin compatible with said binder material.

2. A facing sheet according to claim 1 wherein said lubricant has a particle size of about 1–25 microns and a melting point of about 220°–230° F.

3. A facing sheet in accordance with claim 1 wherein said lubricant is a polymer wax having a particle size of about 1–25 microns.

4. A facing sheet in accordance with claim 1, wherein said lubricant is a micronized polyethylene wax present in said ultra-thin facing layer in an amount of 0.175 to 0.5 pounds per ream of facing paper; said thermosetting resin is polyester resin or melamine-formaldehyde resin; and said binder material is microcrystalline cellulose, carboxymethylcellulose, sodium alginate or mixtures thereof.

5. A facing sheet according to claim 1 wherein said lubricant has a particle size of less than 30 microns and a melting point of about 180°–285° F.

6. A facing sheet according to claim 5 wherein said lubricant is micronized polyethylene wax.

7. A facing sheet according to claim 5 wherein said solid, particulate lubricant is present in an amount, based on the total weight of the components of the ultra-thin facing layer, exclusive of said thermosetting resin, of at least 2.5 percent.

8. A facing sheet according to claim 7 wherein the maximum quantity of said solid, particulate lubricant in said ultra-thin facing layer is about 20 percent.

9. A facing sheet according to claim 7 wherein said solid, particulate lubricant is present in said ultra-thin facing layer in an amount of 0.175 to 0.5 pounds per ream of facing paper.

10. A facing sheet according to claim 5 wherein said thermosetting resin is polyester resin or melamine-formaldehyde resin.

11. A facing sheet according to claim 5 wherein said binder material is microcrystalline cellulose, carboxymethylcellulose, sodium alginate or mixtures thereof.

12. A method of producing a scuff-resistant decorative laminate from at least one backing layer and a thermosetting resin impregnated facing sheet, comprising
    coating an overlay or decor facing sheet with an ultra-thin wet layer of
    (1) a solid, particulate lubricant in an amount sufficient such that during a subsequent consolidation step, the particulate lubricant melts and blooms to the surface thereby providing a laminate having simultaneously good clarity and improved scuff resistance; and
    (2) sufficient binder material for said lubricant particles to bind said particles to the surface of said facing sheet;
    drying said mixture on said facing sheet at a temperature of at least 140° F. and sufficient to enhance the bonding of said particles by said binder material to the surface of said decor sheet, to provide an ultra-thin dry layer of said mixture thereon, said drying being carried out at a temperature less than the melting temperature of said solid, particulate lubricant;
    impregnating said coated facing sheet with a polyester or melamine-formaldehyde thermosetting resin;
    assembling said resin-impregnated and coated facing sheet over at least said backing layer; and
    subjecting said assembly to heat and pressure at a temperature greater than the melting temperature of said solid, particulate lubricant to consolidate said backing layer and said facing sheet to thereby provide said scuff-resistant devorative laminate.

13. A method according to claim 12 wherein said solid, particulate lubricant is a polyethylene wax having a particle size less than 30 microns, a melting temperature of less than 260° F. and preferably 220°–230° F.; and the temperature at which said drying is carried out is approximately 170°–190° F.

* * * * *